Patented Apr. 8, 1952

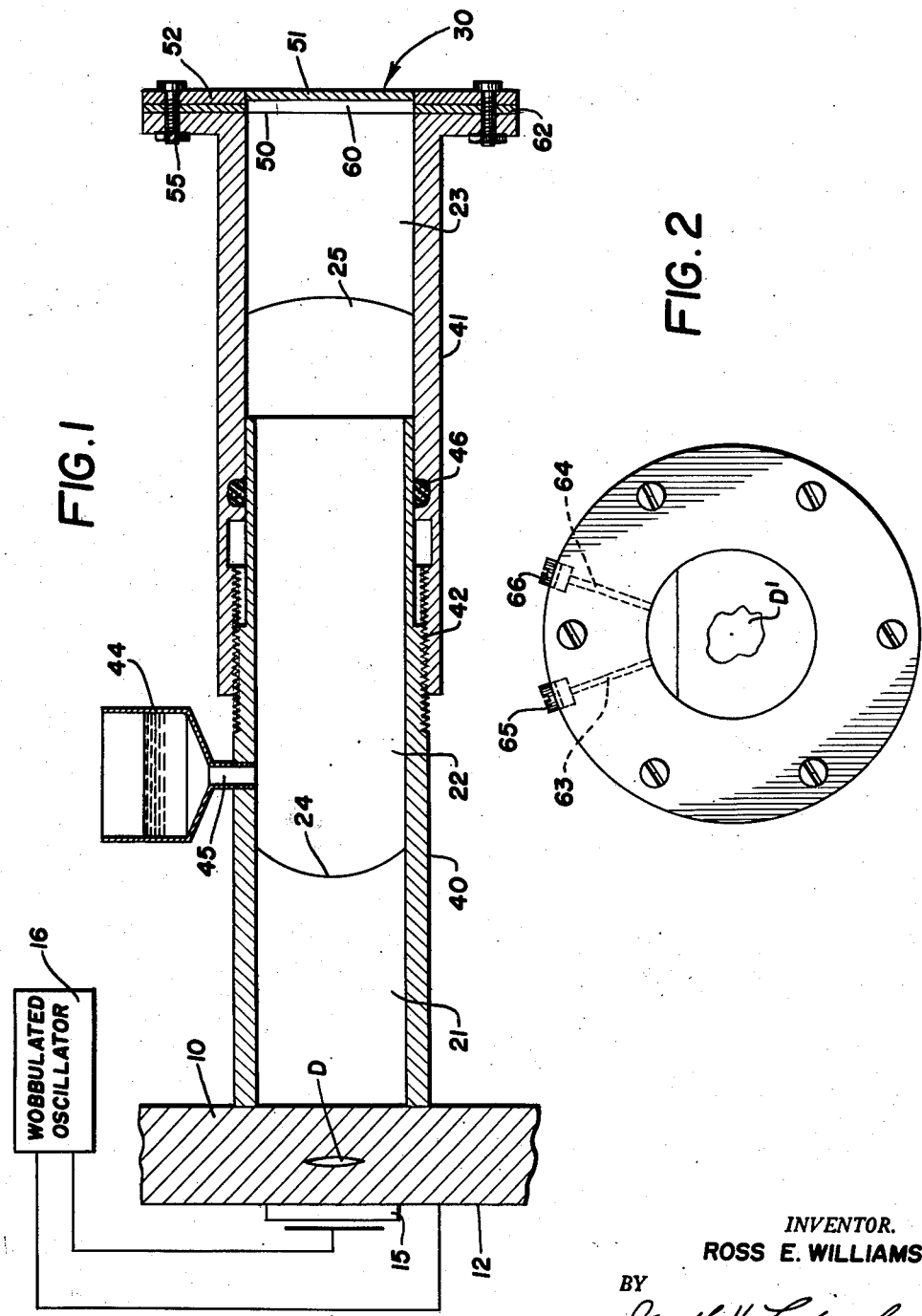

2,592,222

UNITED STATES PATENT OFFICE 2,592,222

LENS SYSTEM FOR ULTRASONIC VIEWING OF DEFECTS IN OBJECTS

Ross E. Williams, Sandy Hook, Conn., assignor to Sperry Products, Inc., Danbury, Conn., a corporation of New York Application April 27, 1949, Serial No. 90,032

4 Claims. (Cl. 73—67)

This invention relates to the ultrasonic inspection of solids of the type wherein it is desired to ascertain not merely whether or not a defect exists and the location of such defect but also to yield an actual representation of the defect. Various devices have been proposed for performing this function. Thus it has been proposed to pass ultrasonic vibrations into the object under test by means of an electro-acoustic transducer, receive by a second electro-acoustic transducer those vibrations which pass through the object and scan the received vibrations over an area to obtain a visual indication of the flaw. This, however, involved a highly complicated system of mechanism. Still another method which has been tried to obtain an actual representation of hidden defects consists in submerging the object under test in liquid, passing ultrasonic waves therethrough by means of an electro-acoustic transducer, concentrating by a lens system those waves which have passed through the object, and focusing these waves on some sort of image-forming device such as an image cell. This method, however, required the highly undesirable step of submerging the object under test in a liquid and also required the use of an image cell having a delicate membrane through which the ultrasonic waves passed, with the result that this membrane tended to bend and sag and frequently broke.

It has heretofore been proposed to solve the above problem by utilizing a lens system comprising either two solids of different acoustic impedances or a solid and a liquid of different acoustic impedances and forming the meeting surface between these two lens parts as a refracting surface adapted to concentrate the vibrations on the image cell which is supported at the outer end of the lens system. This obviated the necessity of submerging the object under test in liquid and constituted a relatively simple method of obtaining an actual representation of the defect within an object. However this lens system was characterized by certain limitations such as, for example, the presence of spherical aberration, and also such systems were subject to the objection that in scanning an object of considerable depth the consequent necessity for focusing the image cell caused a wide variation in magnification of the defect image.

It is therefore one of the principal objects of this invention to provide a lens system which will in the first place permit an image of a defect within an object to be obtained by the use of relatively simple mechanism and without the necessity of submerging the object in liquid. Furthermore it is an object of this invention to provide a lens system which will also minimize the amount of spherical aberration and will reduce to a minimum the variation of magnification in the scanning of an object of considerable depth.

Further objects and advantages of this invention will become apparent in the following detailed description thereof.

In the accompanying drawings,

Fig. 1 is a side elevation, sectioned vertically, and partly diagrammatic, of one embodiment of this invention.

Fig. 2 is a front elevation of the Fig. 1 device

Referring to Fig. 1, there is disclosed the principle of this invention. An object 10 to be tested for internal defects such as internal fissure D has applied to one surface 12 thereof an electro-acoustic transducer 15 which may be energized by an oscillator 16 which may be of the continuously variable frequency type to transmit a continuously variable frequency and thus avoid setting up standing waves. The mechanical vibrations thus induced in transducer 15 which may be a quartz crystal are transmitted through object 10 except in the area occupied by defect D where such waves will either be reduced in intensity or entirely prevented from passing through the object. If therefore on the opposite side of object 10 there are means responsive to the intensity of vibrations passing through the object and if this responsive means can be focused upon an image-forming device, an actual pictorial representation of defect D will be obtained. To accomplish the foregoing purpose there is employed a novel lens system which does not require that the object 10 be immersed in liquid. Instead the invention provides a lens system consisting of three elements such as 21, 22 and 23. The end elements 21 and 23 are of different acoustic velocities from that of the intermediate element 22 and by suitably forming the meeting surfaces 24 and 25 between the end elements and the intermediate element as refracting surfaces the vibration waves transmitted through object 10 can be focused upon an image cell indicated generally at 30. By thus providing two refracting surfaces the image can be focused upon the image cell with a minimum of spherical aberration. Furthermore, by providing the two refracting surfaces as described hereinbefore the image cell may be adjusted relative to the object 10 for scanning the depth of the object and a minimum of variation in magnification of the image will result. This follows from well-known optical laws.

Preferably the end lens members 21 and 23 are solid pieces while the intermediate lens member 22 is a liquid, the said liquid allowing the movement of the image cell for the purpose of focusing. For this purpose the lens members 21, 22 and 23 may be confined within a two-part casing 40, 41, the latter being screw-threaded upon the former as at 42 so that the liquid volume of lens unit 22 may be varied, the surplus liquid communicating with a liquid reservoir 44 in permanent communication with the intermediate member through channel 45. Suitable packing members such as O ring 46 may be provided to prevent loss of liquid.

The image cell 30 may be formed on its inner surface by the end surface 50 of lens member 23. Thus one of the main problems in connection with the use of image cells is avoided, i. e., the necessity for the use of a delicate inner membrane is eliminated. Furthermore, reflection losses are reduced because there is but one interface between the lens member 23 and the liquid in the image cell. The outer surface of the cell may be formed by glass plate 51 set within a frame 52 fixed to the casing member 41 by any suitable means such as the bolts 55. The space 60 between end 50 and plate 51 is substantially filled with a liquid within which small metal disks such as aluminum disks may be suspended, said disks having the property of aligning themselves with their planes normal to the direction of propagation of the vibrations. Thus the diminished vibrations due to the presence of a defect D will result in an area D' on the image cell, comprising disks which have not been turned in the same manner as those in the region of full vibration intensity. Thus an actual image of the flaw will be obtained on the image cell. The liquid may be prevented from discharging from space 60 by means of gasket 62, and openings 63 and 64 may be provided within the frame 52 to allow liquid to be injected and air to escape. These passages 63 and 64 may be sealed by bolts 65 and 66.

Preferably, oil films are provided between the surface 12 of object 10 and the crystal and between the surface 17 of the object and the lens element 21 for better acoustic transmission.

Having described my invention, what I claim and desire to secure by Letters Patent is:

1. In the ultrasonic inspection of objects, means for transmitting ultrasonic waves through one surface of the object, a device for indicating defects within the object, said device comprising a lens system, said lens system comprising a pair of end units and an intermediate unit, the acoustic velocities of the end units differing from the acoustic velocity of the intermediate unit, an image cell, one of the end units being adapted to engage the surface of the object under test opposite the surface in engagement with the transmitting means, the other of the end units being adapted to form one face of the image cell, said end units and intermediate unit having meeting surfaces formed as a plurality of refracting surfaces adapted to project the ultrasonic waves upon the image cell.

2. A device according to claim 1, in which the end units are solid members and the intermediate unit is liquid.

3. A device according to claim 1, in which the units are mounted in a support, the end units being solid members and the intermediate unit liquid, said support comprising two relatively movable members for varying the length of the liquid unit.

4. A device according to claim 1, in which the units are mounted in a support, the end units being solid members and the intermediate unit liquid, said support comprising two relatively movable members for varying the length of the liquid unit, and a reservoir carried by said support in permanent communication with the liquid unit.

ROSS E. WILLIAMS.

REFERENCES CITED

The following references are of record in the file of this patent:

UNITED STATES PATENTS

| Number | Name | Date |
|---|---|---|
| 409,981 | Krogman | Aug. 27, 1889 |
| 1,651,493 | Warmisham | Dec. 6, 1927 |

FOREIGN PATENTS

| Number | Country | Date |
|---|---|---|
| 48,400 | Netherlands | May 15, 1940 |

OTHER REFERENCES

Page 146 of Book entitled "Ultrasonics" by B. Carlin, published by McGraw-Hill Co. 1949.